United States Patent
Mawhinney

(10) Patent No.: US 8,796,965 B2
(45) Date of Patent: Aug. 5, 2014

(54) COMMUTATION CALIBRATION VIA MOTOR MAPPING

(75) Inventor: Joel Mawhinney, San Diego, CA (US)

(73) Assignee: Precision Engine Controls Corporation, San Diego, CA (US)

(*) Notice: Subject to any disclaimer, the term of this patent is extended or adjusted under 35 U.S.C. 154(b) by 243 days.

(21) Appl. No.: 13/248,245

(22) Filed: Sep. 29, 2011

(65) Prior Publication Data

US 2012/0217914 A1  Aug. 30, 2012

Related U.S. Application Data

(60) Provisional application No. 61/447,177, filed on Feb. 28, 2011.

(51) Int. Cl.
*H02P 6/06* (2006.01)

(52) U.S. Cl.
USPC ............... 318/400.12; 318/567; 318/400.09; 318/400.38; 318/700; 318/400.17; 324/207.13; 324/207.16; 324/207.2; 324/207.21; 324/207.25

(58) Field of Classification Search
CPC .......... H02K 11/0021; H02K 11/0026; H02K 11/0031; H02P 21/0039
USPC .......... 318/400.01, 400.12, 400.35, 400.38, 318/700, 400.14, 400.16, 567, 400.09, 318/400.17; 324/207.13, 207.16, 207.2, 324/207.21, 207.25
See application file for complete search history.

(56) References Cited

U.S. PATENT DOCUMENTS

| | | | |
|---|---|---|---|
| 4,697,128 A * | 9/1987 | Matsushita et al. | ........... 318/607 |
| 4,751,441 A | 6/1988 | Lewis | |
| 5,055,764 A | 10/1991 | Rozman et al. | |
| 5,068,590 A | 11/1991 | Glennon et al. | |
| 5,187,417 A | 2/1993 | Minnich et al. | |
| 5,461,293 A | 10/1995 | Rozman et al. | |
| 5,563,980 A | 10/1996 | Chen et al. | |
| 5,694,265 A * | 12/1997 | Kosugi et al. | ........... 360/77.05 |
| 5,854,877 A | 12/1998 | Lewis | |
| 6,396,225 B1 * | 5/2002 | Wakui et al. | ........... 318/400.01 |
| 6,803,741 B2 * | 10/2004 | Messersmith | ........... 318/729 |
| 6,891,346 B2 * | 5/2005 | Simmons et al. | ........... 318/400.04 |
| 7,023,155 B2 * | 4/2006 | Tieu | ........... 318/276 |
| 7,692,395 B2 * | 4/2010 | Brown | ........... 318/400.13 |
| 8,283,813 B2 * | 10/2012 | Gilchrist et al. | ........... 310/12.14 |
| 8,330,311 B2 * | 12/2012 | Ramsey et al. | ........... 310/90.5 |

* cited by examiner

*Primary Examiner* — Rita Leykin
(74) *Attorney, Agent, or Firm* — Carlson, Gaskey & Olds P.C.

(57) ABSTRACT

A DC brushless motor includes a rotary actuation shaft having multiple poles. Each of the poles has multiple commutation steps. The DC brushless motor also includes a motor controller capable of controlling rotation of the rotary actuation shaft. The motor controller stores a commutation step map.

17 Claims, 1 Drawing Sheet

COMMUTATION CALIBRATION VIA MOTOR MAPPING

RELATED APPLICATION

This application claims priority to U.S. Provisional Application No. 61/447,177, which was filed Feb. 28, 2011.

BACKGROUND

The present disclosure is directed toward rotary actuators, and more particularly toward DC brushless motor control for rotary actuators.

DC motors for use in rotary actuators are typically brushless DC poly-phase motors. A standard DC motor includes a plurality of motor poles, each of which includes multiple commutation steps (steps within each pole). By way of example a brushless DC three-phase motor includes six motor poles, each of which has six commutation steps. This results in a total of thirty-six commutation steps around the shaft, with each of the commutation steps being approximately ten degrees offset from each adjacent commutation step. Motors of this type are typically controlled by a sensor capable of determining the rotary position of the shaft, and thereby determining the number of and approximate location of commutation steps needed in order to apply a desired rotation.

In a standard DC motor, it is assumed that the commutation steps are evenly distributed around the shaft. Known methods for determining how many commutation steps to rotate the shaft in order to achieve desired angle of rotation divide the desired angle of rotation by the assumed angular distance between commutation steps. The resulting integer is the number of commutation steps that the shaft is rotated. If variations are present in the angular distance between commutation steps, then the resulting rotation provides an incorrect location of commutation change, reducing available torque, efficiency, and peak velocity.

SUMMARY

A method for generating a motor commutation map includes the steps of determining a magnetic center of a current commutation step of a motor and storing the magnetic center in a database, rotating a rotary actuation shaft of said motor to a next commutation step, and determining a magnetic center of said next commutation step of said motor and storing said magnetic center in said database.

A method for operating a motor for a rotary actuator includes the steps of determining a current commutation step of a motor, determining a number of commutation steps required to rotate a rotary actuation shaft of the motor a desired angular distance using a commutation step map, and rotating the rotary actuation shaft the determined number of commutation steps.

A motor includes a rotary actuation shaft, a plurality of poles, each of which have a plurality of commutation steps about the rotary actuation shaft. A motor controller is capable of controlling rotation of the rotary actuation shaft. The motor controller includes a memory to store a commutation step map.

DETAILED DESCRIPTION

Figure 1:
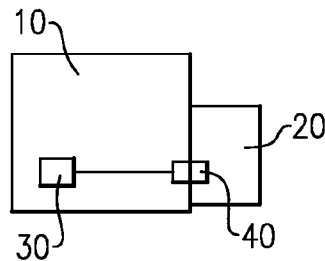
FIG. 1 schematically illustrates an example DC motor.

FIG. 1 illustrates a DC motor 10 that has a rotary actuation shaft 20 and a motor controller 30. The rotary actuation shaft 20 position is detectable via a sensor 40 that reports to the controller 30. The DC motor 10 can be a brushless DC three-phase motor having six magnetic poles, and thirty-six total commutation steps. In prior art systems each of the commutation steps are presumed to be equidistant about rotary shaft. In practical implementations, however, the angular distance between commutation steps can vary as much as +/- one degree or more. This variance results in decreased torque and efficiency in systems using the prior art assumptions.

Figure 2:
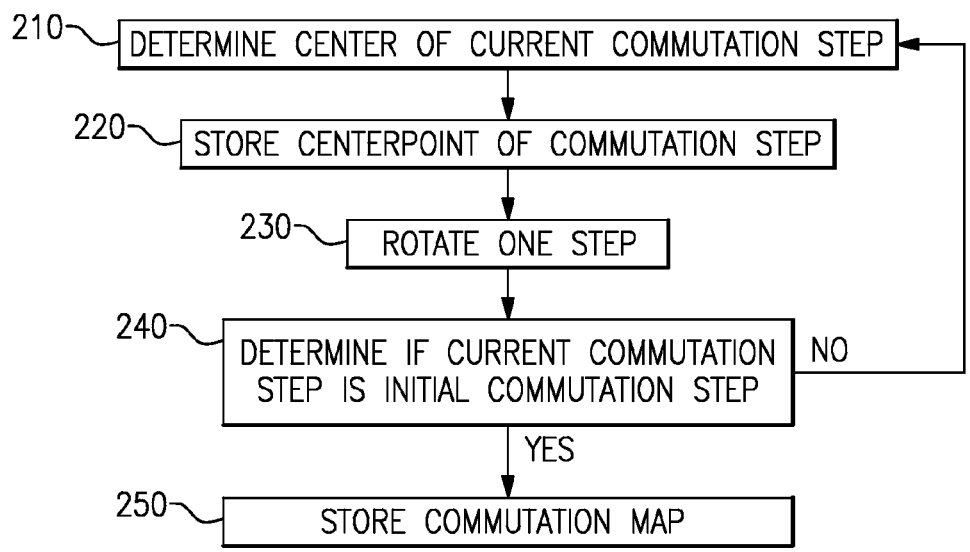
FIG. 2 illustrates an example method for generating a commutation step map.

In order to compensate for the variations in magnetic centers of the commutation steps, a commutation step map is generated according to a map generation method illustrated in FIG. 2. Initially, the controller 30 (illustrated in FIG. 1) determines the magnetic center of the commutation step that the motor is currently on in a "determine center of current commutation step" step 210. The magnetic center of the commutation step is determined by applying a current to the motor to pull the rotor into "centered" position, and using a sensor 40 (illustrated in FIG. 1). The sensor 40 detects the exact angular position of the rotary actuation shaft 20. The sensor 40 may be a resolver or other rotary position sensor. The magnetic centerpoint of the initial commutation step is then stored in a "store centerpoint of commutation step" step 220. After storing the magnetic centerpoint of the first commutation step, the motor 10 rotates the rotary actuation shaft 20 by one commutation step in a "rotate one step" step 230.

The controller 30 then checks to see if the current commutation step is the commutation step on which the mapping method started (the initial commutation step) in a "determine if current commutation step is initial commutation step" step 240. If the current commutation step is not the initial commutation step, the process repeats itself beginning with the "determine center of current commutation step" step 210. If the current commutation step is the initial commutation step, then the commutation map of the motor 10 is completed and stored in a "store commutation map" step 250.

The information in the commutation map is then used to determine the exact angular position at which to switch the motor commutation to induce continued motion and these angular positions are stored in an array or look-up table. The look-up table of commutation positions a/k/a commutation map, is stored in a writable memory of the controller 30, for example, in one or more databases. When the motor 10 is commanded to rotate, the controller 30 will monitor the position measurement from the sensor 40 and compare this with the locations stored in the table to decide when to activate the next motor winding combination to continue or hold position. Storing this information provides customized calibration for the motor 10 to account for non-uniform distribution of commutation steps and manufacturing variations between systems.

Figure 3:
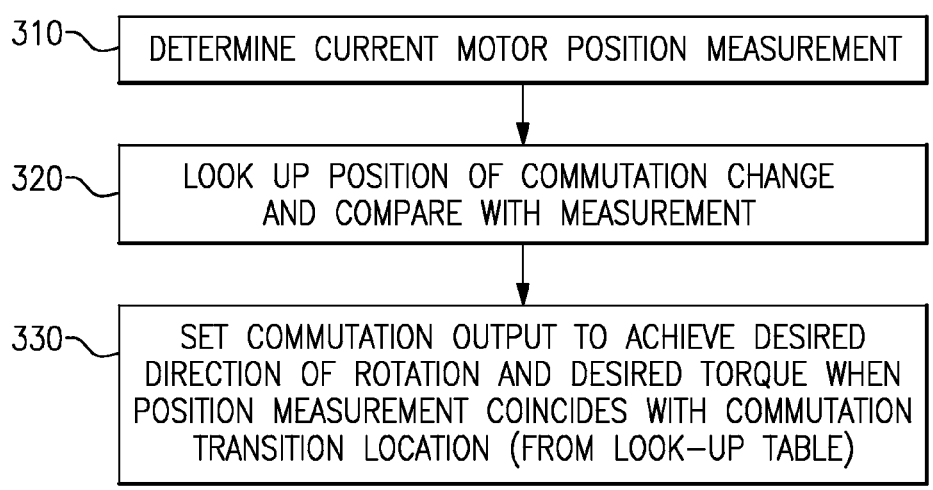
FIG. 3 illustrates an example method for operating a motor.

The commutation map and the look-up table are used to control the motor 10 for a rotary actuator according to a process illustrated in FIG. 3. When the motor 10 receives an instruction to rotate a certain angular distance, or provide a certain amount of torque, a controller 30 determines how to activate the motor windings in proper sequence and appropriate timing to achieve the desired rotation using the look-up table. The controller 30 uses a sensor 40 to determine which commutation step the motor 10 is currently on in a "determine current motor position measurement" step 310.

Once the current position is determined, the controller 30 looks up the exact location of transition between commutation steps in a "look up position of commutation change and compare with measurement" step 320. The controller 30 then determines exactly when to change the commutation output in order to obtain the desired direction of rotation or torque in the "set commutation outputs to achieve desired direction of rotation and desired torque when position measurement coincides with commutation transition location" step 330. The controller 30 then causes the motor 10 to rotate the rotary actuation shaft 20 with the proper sequence, at the optimum switching position. Using this process, the controller 30 can compensate for variability in the angular distances between commutation steps, and can thus provide more accurate and efficient rotation of the rotary actuation shaft 20 than the prior art systems.

Although an example embodiment has been disclosed, a worker of ordinary skill in this art would recognize that certain modifications would come within the scope of this disclosure. For that reason, the following claims should be studied to determine the true scope and content of this disclosure.

What is claimed is:

1. A method for generating a motor commutation map comprising the steps of:
   determining a magnetic center of a current commutation step of a motor by sensing an angular position or said rotary actuation shaft using a sensor and storing said magnetic center in a database;
   rotating a rotary actuation shaft of said motor to a next commutation step;
   determining a magnetic center of said next commutation step of said motor and storing said magnetic center in said database; and
   repeating said steps of rotating said rotary actuation shaft of said motor to said next commutation step and determining said magnetic center of said next commutation step of said motor and storing said magnetic center in said database until a magnetic center is stored for each commutation step of said motor.

2. The method of claim 1, further comprising the step of creating a commutation map indicating an exact angular location of each commutation step based on said stored magnetic centers.

3. The method of claim 2, further comprising the step of storing said commutation map as a look-up table.

4. The method of claim 3, further comprising the step of storing said commutation map in a writeable controller memory.

5. A method for operating a motor for a rotary actuator comprising the steps of:
   determining a current commutation step of a motor;
   determining commutation steps required to rotate a rotary actuation shaft of said motor a desired angular distance using a commutation step map, wherein said commutation step map comprises a stored empirically determined magnetic center of each commutation step of the rotary actuator; and wherein each stored magnetic center is determined by sensing an angular position of said rotary actuation shaft using a sensor; and
   rotating said rotary actuation shaft using determined locations for commutation steps.

6. The method of claim 5, further comprising the step of determining an exact location of commutation switching using said commutation step map.

7. The method of claim 6, wherein said step of determining said location of commutation switching using said commutation step map comprises the step of using a motor controller to access said commutation step map stored in a memory of said motor controller.

8. The method of claim 5, wherein said step of determining said number of commutation steps required to rotate said rotary actuation shaft of said motor said desired angular distance using said commutation step map comprises accessing a look-up table storing said commutation step map.

9. The method of claim 5, wherein said commutation step map is a database storing a magnetic center of each commutation step of the motor.

10. The method of claim 5, wherein said commutation step map is a look-up table of commutation positions.

11. A method for operating a motor for a rotary actuator comprising the steps of:
    determining a current commutation step of a motor;
    determining commutation steps required to rotate a rotary actuation shaft of said motor a desired angular distance using a commutation step map by calculating an appropriate time to switch commutation to rotate said rotary actuation shaft said desired angular distance using a controller based on said commutation step map; wherein the commutation step map comprises a magnetic center of each commutation step of the motor and each magnetic center stored in the commutation step map is determined by sensing an angular position of said rotary actuation shaft using a sensor; and
    rotating said rotary actuation shaft using determined locations for commutation steps.

12. A motor comprising:
    a rotary actuation shaft;
    a plurality of poles, each of said poles having a plurality of commutation steps about said rotary actuation shaft; and
    a motor controller capable of controlling rotation of said rotary actuation shaft, wherein said motor controller comprises a memory storing a commutation step map, wherein said commutation step map stores a magnetic center point of each commutation step of the motor, and wherein each stored magnetic sensor is an empirically determined magnetic center and was determined by sensing an angular position of said rotary actuation shaft using a sensor.

13. The motor of claim 12, further comprising a sensor for sensing an angular position of said rotary actuation shaft.

14. The motor of claim 13, wherein each of said plurality of poles is approximately evenly spaced radially about said rotary actuation shaft.

15. The motor of claim 12, wherein said memory is a writeable memory.

16. The motor of claim 12, wherein said commutation step map is a database storing a magnetic center of each commutation step of the motor.

17. The motor of claim 12, wherein said commutation step map is a look-up of commutation positions.

* * * * *